Dec. 18, 1962  N. D. COMMISSO  3,068,939
FRAME FOR MOUNTING PLASTIC FILM
Filed Oct. 20, 1959  2 Sheets-Sheet 1
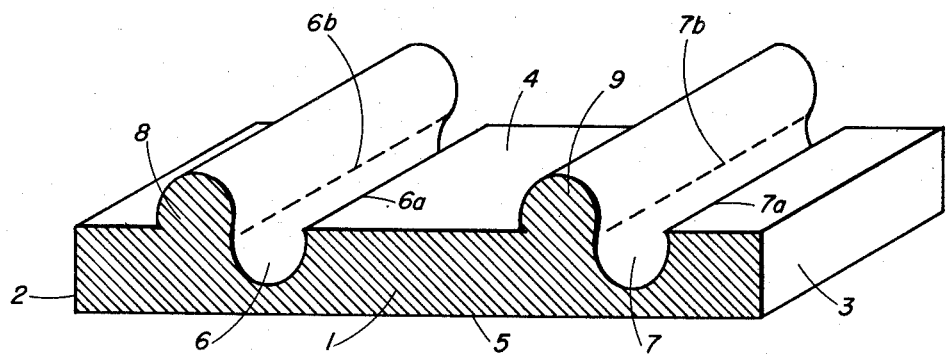
FIG. I
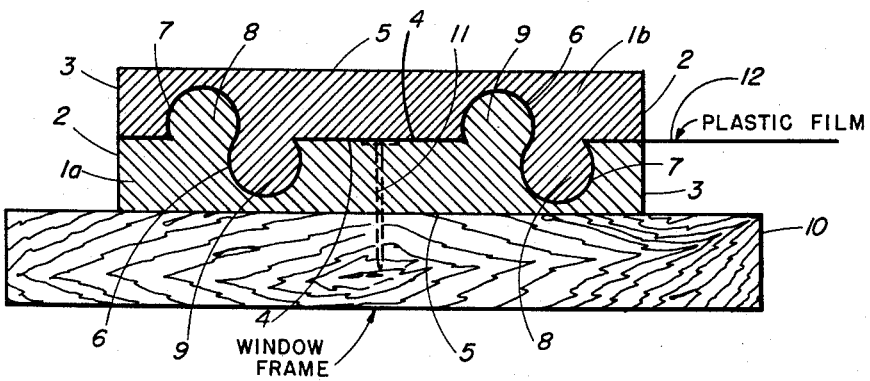
FIG. II
NICHOLAS D. COMMISSO
INVENTOR.
BY Dec. 18, 1962  N. D. COMMISSO  3,068,939
FRAME FOR MOUNTING PLASTIC FILM
Filed Oct. 20, 1959  2 Sheets-Sheet 2
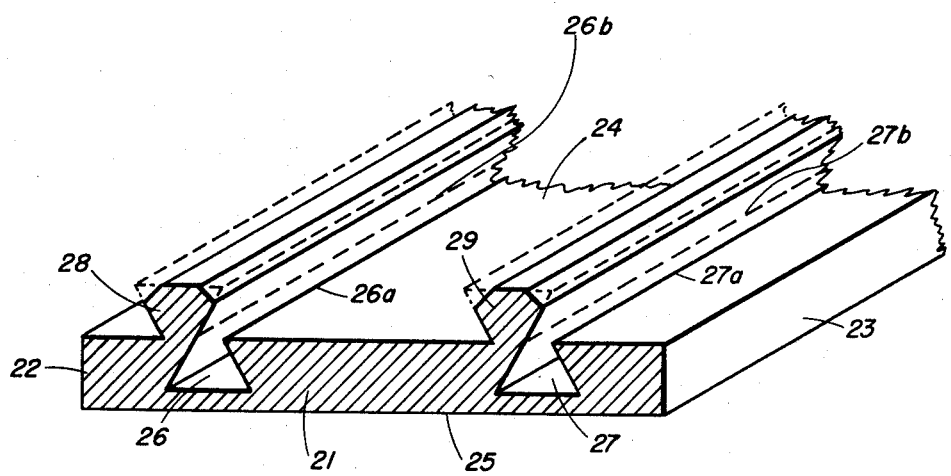
FIG. III
NICHOLAS D. COMMISSO
INVENTOR.
BY E. J. Berry

United States Patent Office 3,068,939
Patented Dec. 18, 1962

3,068,939
FRAME FOR MOUNTING PLASTIC FILM
Nicholas D. Commisso, Victor, N.Y., assignor to National Distillers and Chemical Corporation, a corporation of Virginia
Filed Oct. 20, 1959, Ser. No. 847,511
6 Claims. (Cl. 160—392)

The present invention relates to a mounting strip for securing thin sheets of extruded plastic films in substantially sealed relation to a rigid mounting surface. The invention further relates to such a mounting strip adapted to be formed continuously from an extruded plastic material such as polyvinyl chloride or another deformable, resilient material. Additionally, the invention relates to a moulded mounting strip of a deformable, resilient material, wherein cut lengths of such a strip may be cooperatively related and joined in face to face relation, whereby to engage and hold the free edges of a sheet of plastic film. More specifically the invention relates to a means for mounting thin sheets of plastic film when employed to insulate window, door, or other frame openings from the effects of wind, rain, snow and the like.

A current practice is to employ thin sheets of plastic film, such as obtained by extrusion of polyeethylene, and other thermoplastic materials, as weather protective covers for structural openings, such as for windows and doors, both before and after installation of the standard sash and door closures therefor. Additionally such materials are frequently employed in the construction of "cold frames," whereby to obviate the use of more expensive and frangible glass.

When so employed, difficulties are experienced in mounting the plastic material on the wood or metal framing material. Having no rigidity in the inexpensive form of thin sheets, the plastic material cannot be stapled, tacked, or otherwise conveniently fastened directly to the framing material. In most every instance supplementary means, in the form of overlay materials, such as wood slats and the like, must be applied in order to engage and hold the free edges of the plastic film in reasonably well fixed relation to the mounting surface. While such expedients afford a passable means for mounting plastic films for the purposes stated, they are generally unsatisfactory and unreliable, the films being thin and easily torn along the lines of penetration by nails and other fastening means, cannot be stretched sufficiently to obtain a smooth and taut surface. Also, due to the substantially complete lack of "body" in such films, they are extremely difficult to manipulate properly under the conditions encountered in application to a framed opening.

It is an object of the present invention to provide a means for mounting a thin sheet of a plastic film material over a framed opening, which means is especially adapted to engage and hold a free edge of the film material uniformly, and without need for penetration thereof by fastening devices such as nails, screws or the like. It is a further object of this invention to provide a mounting strip device, which itself may be formed of a deformable, resilient material, including rubber, rubber-like, and plastic materials such as polyvinyl chloride, polyethylene, and other extrudable and mouldable thermoplastic materials. An especial object of the present invention is to provide a mounting strip which may be produced in continuous moulding or extruding operation, and from which individual sections may be cut and cooperatively related to form a two part assembly, adapted to engage and retain the free edge of a plastic film sheet between the parts.

The invention and its objects may be more fully understood from the following description, when it is read in conjunction with the accompanying drawings, of which FIG. 1 is a view in perspective of a section of a mounting strip according to the present invention.

FIG. 2 is a fragmentary, partly cross-sectional view of an assembly in which two mounting strip sections, applied to an open frame structure, are joined in cooperative relation to engage and retain the free edge of a sheet of plastic film;

FIG. 3 is a view similar to that of FIG. 1 illustrating an alternate bead and recess conformation.

Referring now to FIG. 1, in this drawing the numeral 1 designates a mounting strip of the character contemplated, having edge portions 2 and 3, and parallel planar surface portions 4 and 5. One or more recesses are formed in one strip surface portion extending inwardly of the strip, and longitudinally thereof, in parallel relation to the edge portions. An equally corresponding number of bead portions are also formed in the same strip surface extending outwardly therefrom, and each is disposed in immediately contiguous, coextensive relation to a correspondent recess.

In FIG. 1, the mounting strip 1 provides a series of two recess portions 6 and 7, and a corresponding series of bead portions 8 and 9, wherein the bead 8 is contiguous to recess 6, and the bead 9 to recess 7. Also as shown, each recess has an outer end substantially defined in the strip surface between definitive edge portions 6a and 7a and lines, lying in the strip surface plane, indicated by dotted lines designated 6b and 7b respectively. Each of the definitive edge portions 6a and 7a, it will be noted, defines a relatively sharp angle with the surface of the mounting strip. Preferably the outer end of each recess has a lateral dimension less than the greatest lateral dimension of the recess, taken in a plane substantially parallel to planes common to the respective strip surface portions, but greater than about one-half the recess greatest lateral dimension. For further specific definition and location of the recesses, the recess edge portions 6a and 7a are designated as adjacent to the strip edge portion 3, while the non-definitive edge portions 6b and 7b are designated as non-adjacent. The non-adjacent edges of the outermost recesses in any series are spaced in equidistant relation to an adjoining edge of said strip.

The bead portions 8 and 9 are formed substantially integrally with the strip 1, in paired relation with the respective recesses 6 and 7, and coextensive with the designated non-adjacent end edge portions thereof. Each bead portion has a cross-sectional area and peripheral contour essentially corresponding to the cross-sectional area and surface contour of its contiguous recess. Additionally, the respective and corresponding bead and recess portions are so related that the contiguous outer and inner peripheral surfaces meet and join along the line of a non-adjacent edge portion of the recess, in the plane of the strip surface, to form a substantially continuous smooth curve.

A strip conforming to the requirements of structure and form as set forth above is adapted for use in the manner contemplated by dividing the strip into longitudinal sections. Then, by proper orientation of one section with respect to another, the respective recesses and beads of one section may be brought into a mating relationship with those of another section. Such orientation of sections may be accomplished by inversion of one section with respect to the other by rotation thereof on its longitudinal axis. In an extruded strip this rotation would be on its axis of extrusion.

FIG. 2 illustrates the cooperative relationship established by such orientation of strip sections. FIG. 2 also illustrates the manner in which the free edges of a plastic film sheet may be engaged and retained between strip sections, as well as the typical application of such sections to a framed opening.

As illustrated by FIG. 2, a first section 1a of the strip 1 is shown in its applied relationship to a rail portion 10 of an open frame, such as a cold frame. The number 11 designates a fastener, such as a nail, employed to hold the section 1a of strip 1 in fixed relation to the frame 10. The numeral 1b designates a second strip section cut from the same strip, or one of identical conformation as strip section 1, the strip section 1b having been rotated on its extrusion axis to dispose the beads 8 and 9 in opposition to the recesses 7 and 6 respectively.

In this relationship, and with the free edge of a plastic film sheet 12 interposed between the strip sections, the sections are pressed together, whereby they are forced into a mated relationship, with the sheet 12 engaged and retained between them. Of course, in the typical assembly contemplated according to the present invention, eight strip sections will be utilized to accommodate for the four sides of a typical frame.

The strip structure according to FIG. 1 contemplates contiguous bead and recess forms of substantially circular cross-section. Within the scope of the inventive concept set forth above, other recess and bead forms may be employed. A typical variation, or alternate bead and recess conformation is shown by FIG. 3.

As shown, a mounting strip 21 has side edge portions 22 and 23, and opposite surface portions 24 and 25. Other parts of the strip as shown in. FIG 3 also correspond with those shown in FIGS. 1 and 2, and are designated by similar numerals from 26 to 29 inclusive. The strip as shown in FIG. 3 differs from that shown in FIGS. 1 and 2 only in the specific conformation of the recesses 26 and 27 and the beads 28 and 29. In the form according to FIG. 3, these elements are characterized by a substantially isosceles-trapezoid cross-section, wherein the base corner portions have been eliminated, to facilitate entry of the beads into the corresponding recesses. The eliminated portions are shown by broken lines in the drawing. Nevertheless, the peripheral surfaces of the recesses meet with the peripheral surfaces of the beads in an uninterrupted plane, with the apparent juncture in a plane common to the surface 24, and along a line therein as designated by the numerals 26b and 27b.

What is claimed is:

1. A device for retaining a sheet of thin, flexible plastic film therebetween, said device comprising a mated pair of strips of deformable resilient material, each strip including side edge portions and substantially parallel surface portions therebetween, the opposed surfaces of each of said strips being provided with a series of spaced recesses disposed in parallel relation to each other and to the strip side edge portions, the opposed surfaces of each of said strips also being provided with a series of similarly spaced and outwardly extending bead portions, each of said bead portions being disposed in paired relationship with a corresponding recess and in immediate contiguous relation with one edge of said recess, the opposite edge of said recess defining a relatively sharp angle with the surface of said strip to form an angular deformable lip along said edge, said bead portions and recesses being of substantially complementary configurations, the surface of each bead portion on one side thereof meeting the surface of a contiguous recess in a substantially uninterrupted plane, the other side of said bead meeting the surface of said strip at an angle corresponding to that of said recess lip, the width of the mouth of each recess being less than the maximum width of each bead portion, the construction and arrangement being such that when said pair of strips are pressed together with a sheet of relatively thin and flexible sheet of plastic film therebetween, the bead portions of each will enter the recesses of the other carrying said sheet material therewith.

2. A device for the retention of a sheet of thin, flexible plastic film, comprising a strip of deformable resilient material including side edge portions and substantially parallel surface portions therebetween, a series of spaced recesses defined in one surface of said strip in parallel relation to each other and to said strip side edge portions, a series of similarly spaced bead portions extending outwardly from the same surface of said strip in which said recesses are located, each of said bead portions being disposed in paired relationship with a corresponding recess and in immediate contiguous relation with one edge of said recess, said bead portions and recesses being of complementary configurations, the surfaces of each bead portion and associated recess meeting in a substantially uninterrupted plane, the opposite edge of each recess defining a relatively sharp angle with the surface of said strip to form an angular deformable lip along said edge, and the surface of said bead, removed from said recess, meeting said strip surface at an angle corresponding to that of said recess lip, the width of the mouth of each recess being less than the maximum width of each bead portion, whereby one individual section of said strip, when reversed and rotated 180° about its longitudinal axis, may be cooperatively engaged with another such section with mated insertion of the bead portions of one section in the recesses of the other section, by deformation of said recess lips under pressure of said mating bead portions.

3. A moulded strip according to claim 2, wherein said beads and recesses are of substantially circular cross-sectional configuration and the surfaces thereof meet tangentially along a line lying in the plane of the strip surface portion.

4. A moulded strip according to claim 2, wherein said beads and recesses are of substantially isosceles-trapezoid cross-sectional configuration and the meeting surfaces of each bead and recess lie in the same plane.

5. A moulded strip according to claim 4, wherein each bead portion of substantially isosceles-trapezoid cross-sectional configuration is of a modified form in which triangular sections are eliminated from each base corner of said isosceles-trapezoid configuration.

6. A moulded strip according to claim 5, wherein said triangular sections are equi-angular.

References Cited in the file of this patent

UNITED STATES PATENTS

| | | |
|---|---|---|
| 108,348 | Goodwillie | Oct. 18, 1870 |
| 203,468 | Lane | May 7, 1878 |
| 2,035,674 | Sipe | Mar. 31, 1936 |
| 2,386,502 | Peik | Oct. 9, 1945 |
| 2,899,256 | Kelley | Aug. 11, 1959 |
| 2,914,936 | Reinold | Dec. 1, 1959 |
| 2,939,195 | Carlson | June 7, 1960 |